US010652742B2

(12) United States Patent
Rezaei

(10) Patent No.: US 10,652,742 B2
(45) Date of Patent: May 12, 2020

(54) HYBRID AUTHENTICATION OF VEHICLE DEVICES AND/OR MOBILE USER DEVICES

(71) Applicant: Valeo North America, Inc., Auburn Hills, MI (US)

(72) Inventor: Shahram Rezaei, Troy, MI (US)

(73) Assignee: VALEO COMFORT AND DRIVING ASSISTANCE, Créteil (FR)

(*) Notice: Subject to any disclaimer, the term of this patent is extended or adjusted under 35 U.S.C. 154(b) by 175 days.

(21) Appl. No.: 15/817,660

(22) Filed: Nov. 20, 2017

(65) Prior Publication Data

US 2019/0159026 A1 May 23, 2019

(51) Int. Cl.
*H04W 12/06* (2009.01)
*H04L 29/06* (2006.01)
*H04W 12/08* (2009.01)

(52) U.S. Cl.
CPC ......... *H04W 12/06* (2013.01); *H04L 63/0853* (2013.01); *H04L 63/101* (2013.01); *H04W 12/08* (2013.01)

(58) Field of Classification Search
CPC .... H04W 12/06; H04W 12/08; H04L 63/101; H04L 63/0853
USPC .......................................................... 726/4
See application file for complete search history.

(56) References Cited

U.S. PATENT DOCUMENTS

| | | | |
|---|---|---|---|
| 8,143,994 B2 | 3/2012 | Jung | |
| 9,002,750 B1* | 4/2015 | Chu | G06F 21/123 705/72 |
| 9,003,500 B2 | 4/2015 | Oglesbee et al. | |
| 9,108,579 B2 | 8/2015 | Camacho et al. | |
| 9,215,228 B1* | 12/2015 | Zhang | H04L 63/08 |
| 9,294,476 B1* | 3/2016 | Lurey | H04L 63/0861 |
| 9,561,779 B2 | 2/2017 | Rasal | |
| 9,564,962 B2 | 2/2017 | Yarnold et al. | |
| 9,591,482 B1 | 3/2017 | Finnerty et al. | |
| 9,668,133 B2 | 5/2017 | Kennedy | |
| 9,775,138 B1* | 9/2017 | Lei | H04B 1/082 |
| 2002/0135466 A1* | 9/2002 | Bunyan | B60R 25/24 340/426.1 |
| 2006/0036356 A1* | 2/2006 | Rasin | H04M 1/6091 701/1 |
| 2006/0236363 A1* | 10/2006 | Heard | H04W 12/0401 726/1 |
| 2006/0242685 A1* | 10/2006 | Heard | G06F 21/577 726/3 |
| 2006/0291657 A1* | 12/2006 | Benson | H04L 67/18 380/270 |
| 2007/0027595 A1 | 2/2007 | Nou | |
| 2007/0287421 A1* | 12/2007 | Kirke | H04L 63/102 455/411 |

(Continued)

*Primary Examiner* — Aravind K Moorthy
(74) *Attorney, Agent, or Firm* — Osha Liang LLP

(57) ABSTRACT

A telematics control unit (TCU) of a vehicle includes at least one processor coupled to a memory, the at least one processor comprising a local authentication server configured to authenticate at least one device of a plurality of devices in the vehicle based on a first list of approved devices, and establish, upon successful authentication of the at least one device, a trusted communication link between the TCU and the at least one device to receive a first data from the at least one device and transmit a second data to the at least one device, wherein the first data is stored in the memory for future transmission to a remote server.

17 Claims, 7 Drawing Sheets

(56) References Cited

U.S. PATENT DOCUMENTS

| | | | | |
|---|---|---|---|---|
| 2009/0128286 A1* | 5/2009 | Vitito | H05K 5/0208 | 340/5.8 |
| 2009/0153311 A1* | 6/2009 | Lee | B60R 25/2018 | 340/426.1 |
| 2011/0083161 A1* | 4/2011 | Ishida | H04L 12/40 | 726/2 |
| 2011/0207463 A1* | 8/2011 | Zoeckler | H04W 36/12 | 455/439 |
| 2012/0313796 A1* | 12/2012 | Lee | B60R 25/2018 | 340/989 |
| 2013/0132286 A1 | 5/2013 | Schaefer et al. | | |
| 2013/0227650 A1* | 8/2013 | Miyake | H04L 63/08 | 726/3 |
| 2014/0114497 A1* | 4/2014 | Miyake | H04L 9/32 | 701/1 |
| 2014/0172229 A1* | 6/2014 | Rude | H04L 63/0876 | 701/31.5 |
| 2014/0213238 A1* | 7/2014 | Giraud | G07C 5/008 | 455/418 |
| 2014/0310777 A1* | 10/2014 | Truskovsky | H04L 63/0823 | 726/4 |
| 2015/0193996 A1* | 7/2015 | Van Wiemeersch | G06Q 20/00 | 340/5.72 |
| 2015/0235486 A1* | 8/2015 | Ellis | G07C 9/00309 | 340/5.61 |
| 2015/0288677 A1 | 10/2015 | Chun | | |
| 2016/0065367 A1* | 3/2016 | Oshida | H04L 9/0869 | 370/329 |
| 2016/0082926 A1* | 3/2016 | Mouser | B60R 25/252 | 701/2 |
| 2016/0112418 A1* | 4/2016 | Lu | H04L 63/0876 | 726/7 |
| 2016/0138931 A1* | 5/2016 | Kang | G01C 21/362 | 701/533 |
| 2016/0217635 A1 | 7/2016 | Pudar et al. | | |
| 2017/0060559 A1* | 3/2017 | Ye | G06F 8/65 | |
| 2017/0093536 A1* | 3/2017 | Yoganathan | H04L 67/04 | |
| 2017/0104865 A1* | 4/2017 | Skelton | H04B 1/3822 | |
| 2017/0116804 A1* | 4/2017 | Bae | G07C 9/00896 | |
| 2017/0366521 A1* | 12/2017 | Lei | H04L 63/0236 | |
| 2018/0084537 A1* | 3/2018 | Do | H04W 76/14 | |
| 2018/0086306 A1* | 3/2018 | Schmotzer | B60R 25/1001 | |
| 2018/0198782 A1* | 7/2018 | Savolainen | G06F 21/40 | |
| 2018/0322603 A1* | 11/2018 | Hu | H04L 63/08 | |
| 2019/0052522 A1* | 2/2019 | Makkiya | G07C 5/008 | |
| 2019/0141756 A1* | 5/2019 | Lei | H04W 76/10 | |

\* cited by examiner

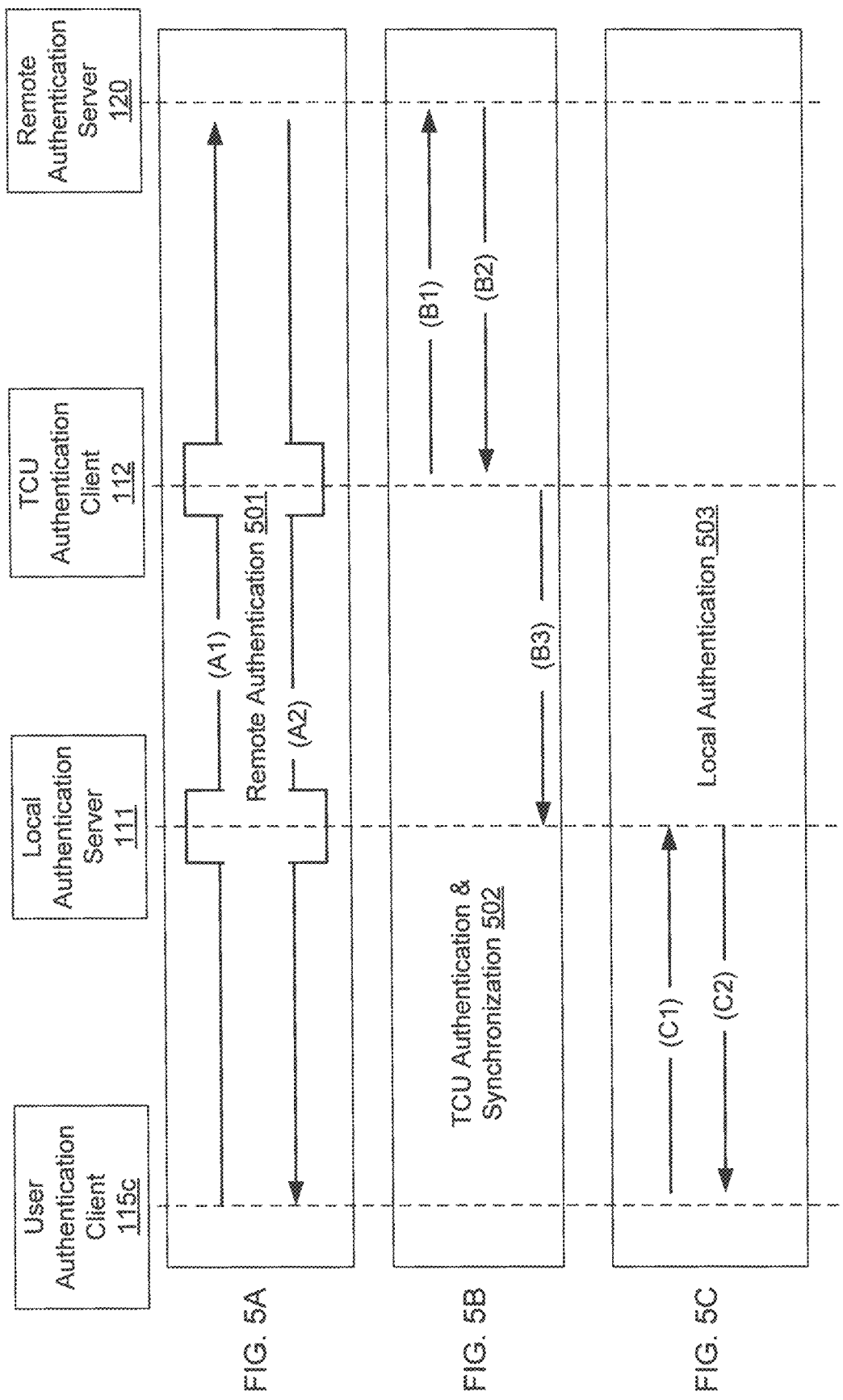

HYBRID AUTHENTICATION OF VEHICLE DEVICES AND/OR MOBILE USER DEVICES

BACKGROUND

Vehicles and their embedded devices may need to send information to remote servers and receive data from the remote servers. Similarly, devices outside of a vehicle (e.g., mobile user devices) may need to interact with the vehicle and its embedded devices. There is a need in the art to authenticate these devices to ensure secure data exchange between these devices and/or remote servers and prevent unauthorized and/or malicious activities.

SUMMARY

In general, in one aspect, the invention relates to a telematics control unit (TCU) of a vehicle. The TCU includes at least one processor coupled to a memory, the at least one processor comprising a local authentication server configured to authenticate at least one device of a plurality of devices in the vehicle based on a first list of approved devices, and establish, upon successful authentication of the at least one device, a trusted communication link between the TCU and the at least one device to receive a first data from the at least one device and transmit a second data to the at least one device, wherein the first data is stored in the memory for future transmission to a remote server.

In general, in one aspect, the invention relates to a method for authenticating devices in a vehicle. The method includes authenticating, using a telematic control unit (TCU) of the vehicle, at least one device of a plurality of devices in the vehicle based on a first list of approved devices, and establishing, upon successful authentication of the at least one device, a trusted communication link between the TCU and the at least one device to receive a first data from the at least one device and transmit a second data to the at least one device, wherein the first data is stored in the memory for future transmission to a remote server.

In general, in one aspect, the invention relates to a non-transitory computer readable medium comprising instructions, that when executed, cause a computer processor to authenticate, using a telematic control unit (TCU) of a vehicle, at least one device of a plurality of devices in the vehicle based on a list of approved devices, and establish, upon successful authentication of the at least one device, a trusted communication link between the TCU and the at least one device to receive a first data from the at least one device and transmit a second data to the at least one device, wherein the first data is stored in the memory for future transmission to a remote server.

Other aspects of the invention will be apparent from the following transaction description and the appended claims.

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

FIGS. 5A, 5B, and 5C show example flow diagrams for authenticating a user device in accordance with one or more embodiments of the invention.

DETAILED DESCRIPTION

Figure 1:
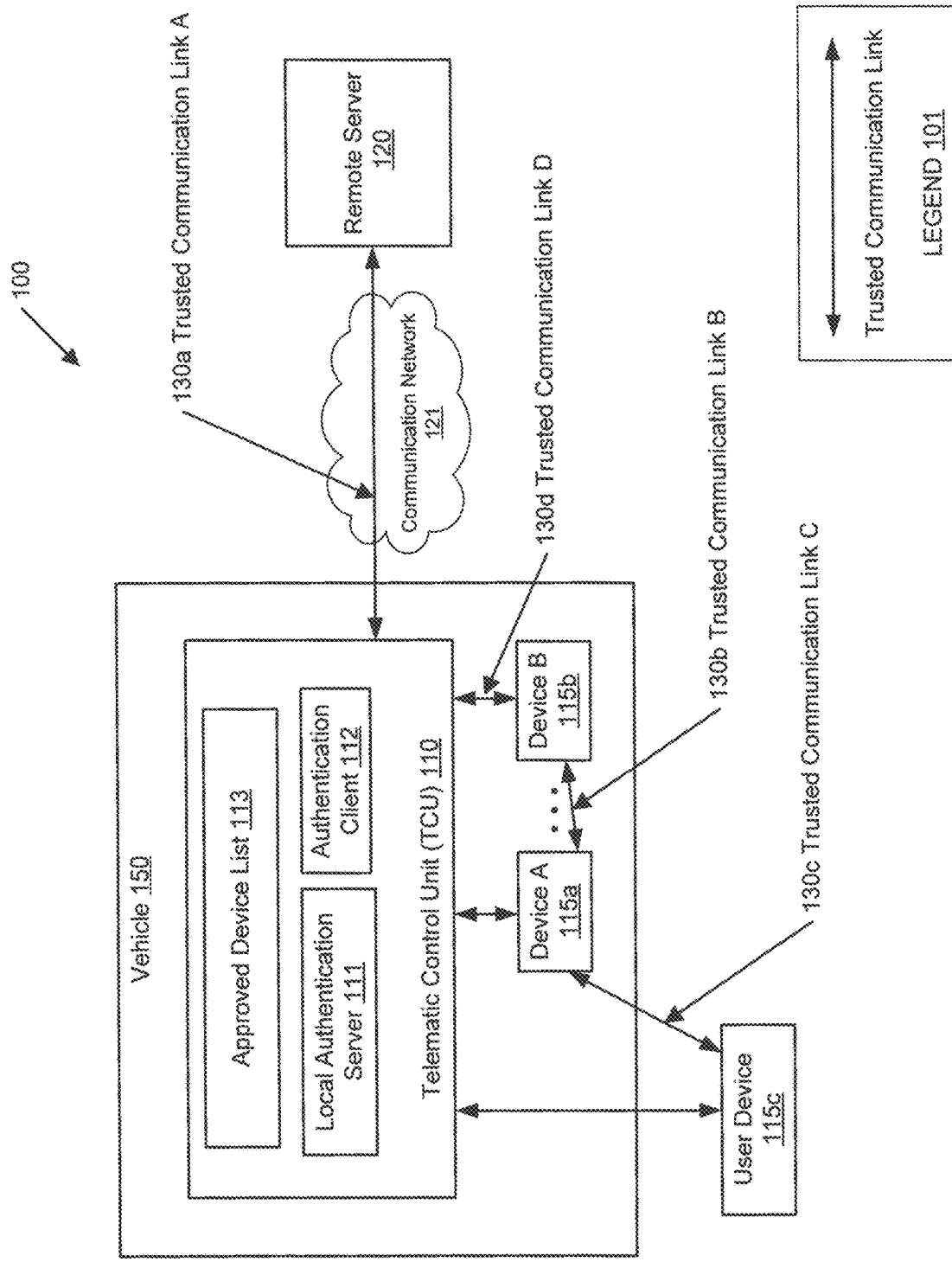
FIG. 1 shows a system in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In the following description, any component described with regard to a figure, in various embodiments of the invention, may be equivalent to one or more like-named components described with regard to any other figure. For brevity, at least a portion of these components are implicitly identified based on various legends. Further, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment which may be implemented in addition to, in conjunction with, or in place of the embodiments described with regard to a corresponding like-named component in any other figure. In the figures, black solid collinear dots indicate that additional components similar to the components before and after the solid collinear dots may optionally exist.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

A device, inside and/or outside of a vehicle, that performs a function of the vehicle is referred to as a vehicle device. Vehicle devices may need to exchange data with each other via multiple wired and wireless links. For example, a radar sensor inside the vehicle may need to send its measurements to a processing unit that upon detecting obstacle ahead of the vehicle triggers automatic braking. Further, a telematics device inside vehicle may need to upload vehicle's location and diagnostics information to a backend server. Additionally, a vehicle may need to provide a user of the vehicle with situational awareness by video feeds. These video feeds may be recorded by cameras and displayed on a cabin display of the vehicle. The radar sensor, telematics device, camera, etc. are examples of devices installed in a vehicle (either at the time of production of the vehicle or later as aftermarket device) and are referred to as embedded or internal vehicle devices or, more specifically, electronic control units (ECUs). As used herein, an ECU is a device in a vehicle that controls one or more functions of the vehicle. Similar to the ECUs controlling vehicle functions, a smart mobile device may also be used by a user of vehicle to control one or more functions of the vehicle, and is referred to as a mobile user device. The embedded vehicle device is typically internal to the vehicle. The mobile user device may be outside or inside the vehicle. The embedded vehicle devices and mobile user devices are collectively referred to as vehicle devices or devices of the vehicle.

In general, embodiments of the invention relate to establishing a trusted communication link between one or more vehicle devices and one or more remote servers, to exchange data. In particular, the one or more vehicle devices may include ECUs and/or user mobile devices. In one or more embodiments of the invention, the trusted communication link is established using a hybrid two-step authentication technique, in which a vehicle device is authenticated by a Telematics Control Unit (TCU) inside the vehicle. Initially, the TCU itself is mutually authenticated with the remote server. Therefore, by authenticating communications links between a vehicle device and the TCU and between the TCU and the remote server, a trusted communication link is established between the vehicle device and remote server.

In one or more embodiments of the invention, the TCU periodically connects with the remote server to synchronize up-to-date access right information of the vehicle devices, such as authentication level, access parameters, period of access, expiration time, etc. Such periodic connection may occur when a network, such as the Internet, is available for the TCU to connect with the remote server. Accordingly, the authentication of the vehicle devices is kept up-to-date.

FIG. 1 shows a system (100) in accordance with one or more embodiments of the invention. In one or more embodiments, one or more of the modules and elements shown in FIG. 1 may be omitted, repeated, and/or substituted. Accordingly, embodiments of the invention should not be considered limited to the specific arrangements of modules shown in FIG. 1.

As shown in FIG. 1, the system (100) includes a remote server (120) wirelessly coupled to a vehicle (150) via a communication network (121), such as a cellular phone network, a WiFi network, a wide area network, a public switched telephone network (PSTN), or any other suitable network.

In one or more embodiments of the invention, the vehicle (150) may be a car, truck, boat, airplane, or any other moving object. The vehicle (150) includes a TCU (110) that is coupled to a number of vehicle devices (e.g., device A (115a), device B (115b), user device (115c), etc.) via direct wired and/or wireless communication link, or via a wired and/or wireless network of the vehicle (150), such as a vehicle area network, Controller Area Network (CAN), or other vehicle bus standards to allow device communications. The TCU (110) further includes a local authentication server (111), an authentication client (112), and an approved device list (113). In one or more embodiments, each of the remote server (120), TCU (110), local authentication server (111), authentication client (112), and vehicle devices includes a hardware component, a software component, or a combination of hardware component and software component. In one or more embodiments, the vehicle devices may include one or more ECUs that may be coupled to one or more sensors of the vehicle (150). For example, an ECU may include an engine control unit, door control unit, electric power steering control unit, human-machine interface, power train control module, seat control unit, speed control unit, transmission control unit, brake control unit, battery management system, or any combination of the aforementioned vehicle units. The sensors may include electromechanical sensors disposed in the engine, brake, passenger cabin, etc. of the vehicle (150). In another example, the sensors may include GPS, radar, cameras, laser scanner devices, etc. In one or more embodiments, the user device (115c) may include a smart car key or remote controller, a smart phone installed with a smart key mobile application or other vehicle related mobile applications, or other types of mobile user devices.

In one or more embodiments of the invention, the remote server (120) includes an authentication server that authenticates the TCU (110) and/or the vehicle devices. In one or more embodiments, the authenticating method may be based on the public key infrastructure (PKI) method. Those skilled in the art will appreciate that the remote server (120) may include one or more processors (not shown), memory (not shown), database (not shown), and other components.

In one or more embodiments of the invention, the local authentication server (111) within the TCU (110) is configured to authenticate a vehicle device using one or more cryptography techniques (e.g., symmetric key, virtual digital key/virtual digital lock pair, PKI, etc.), and based on the approved device list (113). The approved device list (113) is a data structure identifying approved devices. The approved device list (113) may be based on any suitable data structure format, such as a list, a table, a database, etc. For example, the approved device list (113) may include one or more entries to identify one or more of the device A (115a), device B (115b), and user device (115c) as approved devices. In one or more embodiments, the entries in the approved device list (113) may be initially included on the list (113) when the vehicle (150) is manufactured in the factory. In another example, certain entries may be subsequently added to or removed from the approved device list (113) by the TCU (110), e.g., based on information obtained from the remote server (120). In one or more embodiments, the approved device list (113) includes a first portion identifying embedded (or internal) vehicle devices and a second portion identifying user mobile devices that may be external to the vehicle (150). In one or more embodiments, the first and second portions of the approved device list (113) may be periodically updated to reflect changes in the status of approved devices. Those of ordinary skill in the art will appreciate that there may be more than one approved device list. For example, a first list of approved devices may include embedded vehicle device information, while a second list of approved devices may include external device information. In this case, both lists may be stored in a memory inside the TCU (110).

In one or more embodiments, the approved device list (113) may store the device ID for a vehicle device, along with information such as an authentication level of the device, a period of access, an expiration time, or any other suitable parameters associated with device authentication. For example, a user may only be able to access a vehicle during a predefined duration of time.

In one or more embodiments, the local authentication server (111) verifies that a vehicle device is included in the approved device list (113) before authenticating the vehicle device. For example, authenticating the vehicle device may include wired and/or wireless communication to exchange respective public keys between the local authentication server (111) and the vehicle device for generating a shared secret key based on the public key infrastructure (PKI). In another example, authenticating the user device (115*c*) may include receiving user access information from the user device (115*c*) and verifying access rights of the user associated with the user device (115*c*) by comparing the user access information with that stored on the approved device list (113). Those skilled in the art will appreciate that the authentication algorithm configured to perform the authentication of a vehicle device using known cryptographic methods may be stored in and executed on the TCU (110). Further, the authentication performed may be mutual (both the TCU and the vehicle device authenticate each other) or only on the TCU-side.

Upon successful authentication of a vehicle device, a trusted communication link is established between the TCU (110) and the authenticated vehicle device. For example, a trusted communication link D (130*d*) may be established between the TCU (110) and the device B (115*b*). In particular, the trusted communication links (depicted as double-sided arrows according to legend (101)) may be established via the aforementioned wired and/or wireless network of the vehicle (150). A trusted communication link is a secured connection between two devices for transmitting and receiving data. For example, the data may be encrypted for transmission via the secured connection and decrypted subsequent to receiving the data by a receiving device. The encryption and decryption may be based on the public key infrastructure (PKI) or other known cryptography techniques. In one or more embodiments, the trusted communication link is used by the TCU (110) to receive data from and transmit data to the authenticated vehicle device. For example, the data received from the authenticated vehicle device may be stored in the memory of the TCU (110) for future transmission to the remote server (120). In another example, the data transmitted to the authenticated vehicle device may include updating software, algorithm parameters of a laser scanner device, downloaded high definition map, downloaded GNSS (GPS) correction data, etc.

In one or more embodiments, the authentication client (112) is configured to wirelessly authenticate the remote server (120) for the TCU (110). In one or more embodiments, the authentication client (112) is configured to be wirelessly authenticated on behalf of the TCU (110) by the remote server (120). As used herein, "mutual authentication of the remote server (120) and the authentication client (112)" or "mutual authentication of the remote server (120) and the TCU (110)" refers to the authentication client (112) wirelessly authenticating the remote server (120) for the TCU (110) and the authentication client (112) being wirelessly authenticated on behalf of the TCU (110) by the remote server (120). For example, mutual authentication of the remote server (120) and the authentication client (112) may include wireless communication (e.g., via communication network (121)) to exchange respective public keys between the remote server (120) and the authentication client (112) to generate a shared secret key based on the public key infrastructure (PKI) for future communications and verify each other as valid vehicle and valid sever.

In one or more embodiments, the wireless communication between the authentication client (112) and the remote server (120) may be disrupted from time to time. For example, cellular connectivity may not be available in places such as underground parking garage. Even when available, cellular connectivity may be subject to latency, in the order of several seconds. In other words, the wireless communication may be available and suitable only during certain times to allow authenticating the remote server (120) and/or authenticating the authentication client (112). By periodically checking whether approved devices are still authenticated and storing this information locally in the TCU (110), or authenticating new devices locally by the TCU (110), the network connection between the TCU (110) and the remote server (120) may be relied upon less frequently and only when available.

Upon successful wireless mutual authentication between the TCU (110) and the remote server (120), a trusted communication link A (130*a*) is established between the TCU (110) and the remote server (120). Trusted communication link A (130*a*) may be established via a wireless communication channel (121), for example cellular communications or WiFi. The TCU (110) may exchange data with the remote server (120) using the trusted communication link A (130*a*). For example, the TCU (110) may obtain an update of the approved device list (113) from the remote server (120) to authenticate the vehicle device. In another example, the TCU (110) may transmit at least a portion of the data previously received from the authenticated vehicle device to the remote server (120). In this manner, the TCU (110) may relay data from the authenticated vehicle device to the remote server (120) using two trusted communication links in tandem. In other words, the authenticated vehicle device and the remote server (120) exchange data via the TCU (110) in a two-step process. For example, the authenticated device B (115*b*) and the remote server (120) may exchange data via the TCU (110) in the two-step process using the trusted communication link A (130*a*) and trusted communication link D (130*d*) in tandem. Based on the two-step process, the vehicle device may be authenticated for exchanging data with the remote server (120) independent of a network connection for wireless communication between the vehicle (105) and the remote server (120).

Specifically, subsequent to mutually authenticating the remote server (120) and the TCU (110) while the network connection for the wireless communication is available, the vehicle device may be authenticated by the TCU (110) even when the network connection for the wireless communication is unavailable. The vehicle device that is authenticated by the TCU (110) is referred to as an authenticated vehicle device. In one or more embodiments, the TCU (110) sends, to the authenticated vehicle device, an indication that the remote server (120) is authenticated. In addition, the TCU (110) sends, to the remote server (120), another indication that the authenticated vehicle device is authenticated. Accordingly, the TCU (110) may receive data from the remote server (120) and transmit the data to the authenticated vehicle device through the trusted communication links in tandem.

Upon successful authentication of multiple vehicle devices (e.g., device A (115a), device B (115b), user device (115c), etc.), a virtual trusted communication link (e.g., trusted communication link B (130b), trusted communication link C (130c)) is established between two or more of the authenticated vehicle devices. The trusted communication links may be established via various communication channels, including the aforementioned wired and/or wireless network of the vehicle (150). In one or more embodiments, the TCU (110) may send an indication to each of the multiple authenticated vehicle devices that one or more other vehicle devices are also authenticated. For example, the TCU (110) may send the indication to the device A (115a) that the device B (115b) and/or user device (115c) are authenticated. In addition, the TCU (110) sends indications to the device B (115b) and/or user device (115c) that the device A (115a) is authenticated. Accordingly, a vehicle data item may be transmitted, or otherwise exchanged, between the device A (115a) and device B (115b) using the trusted communication link B (130b). Similarly, a vehicle data item may be transmitted, or otherwise exchanged, between the device A (115a) and user device (115c) using the trusted communication link C (130c). In particular, the vehicle data items are exchanged to facilitate these vehicle devices in performing one or more functions of the vehicle (150).

Figure 2:
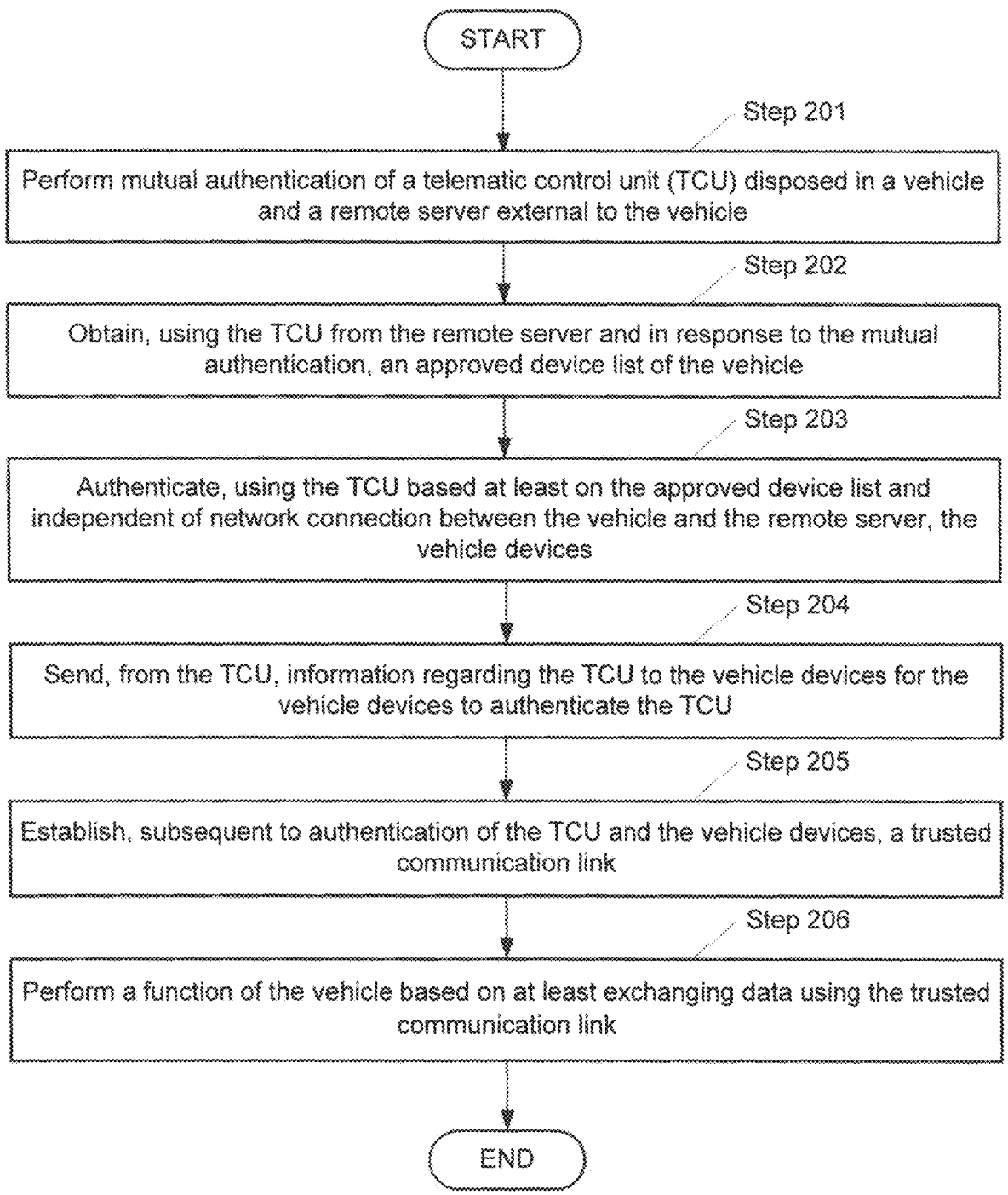
FIG. 2 shows a method in accordance with one or more embodiments of the invention.

FIG. 2 shows a flowchart according to one or more embodiments of the invention. The process shown in FIG. 2 may be executed, for example, by one or more components discussed above in reference to FIG. 1 above. One or more steps shown in FIG. 2 may be omitted, repeated, and/or performed in a different order among different embodiments.

Initially in Step 201, mutual authentication is performed between a telematic control unit (TCU) disposed in a vehicle and a remote server external to the vehicle. In one or more embodiments of the invention, mutual authentication of the TCU and the remote server may include use any one or a combination of cryptographic algorithms. For example, the TCU and the remote server may communicate wirelessly to exchange respective public keys for generating a shared secret key based on the public key infrastructure (PKI) algorithm. In one or more embodiments, the wireless link between the TCU and the remote server may be unavailable from time to time. Accordingly, the mutual authentication may be performed only during certain times when network connection is available and suitable to perform the mutual authentication.

In Step 202, an approved device list of the vehicle is obtained using the TCU from the remote server. Those skilled in the art will appreciate that the approved device list may also be provided to the TCU prior to Step 201. In one or more embodiments, the approved device list may be obtained periodically, whenever the network connection for the wireless communication is available, to reflect changes in the approved vehicle devices. In one example, the approved device list may be initialized during manufacturing of the vehicle.

In Step 203, the vehicle devices are authenticated using the TCU based at least on the approved device list. In one or more embodiments, authentication of the vehicle devices may include, for example, data communication via an internal communication bus of the vehicle to exchange respective public keys between the TCU and the vehicle devices for generating a shared secret key based on the public key infrastructure (PKI). In one or more embodiments, authenticating a user mobile device may include receiving user access information from the user device and verifying access rights of the user by comparing the user access information with the approved device list. Because the internal communication bus is always available independent of network connection between the vehicle and the remote server, the vehicle devices are authenticated by the TCU (e.g., local authentication unit) regardless whether the wireless network connection to the remote server is available or not.

In Step 204, in one or more embodiments, the TCU sends out its authentication information to vehicle devices for authentication. Each vehicle device individually, or multiple vehicle devices collectively, authenticate the TCU using the authentication information received from TCU and other information previously obtained regarding the TCU from other sources. In one or more embodiments of the invention, authentication of the TCU by vehicle devices may include using one or more cryptographic algorithms.

In Step 205, trusted communication links are established following successful authentication of TCU and the vehicle devices. In one or more embodiments, the trusted communication link is established between the remote server and one or more authenticated vehicle devices, via the TCU. Further, in one or more embodiments, a trusted communication link may also be established between two or more authenticated vehicle devices.

In Step 206, a function of the vehicle is performed by at least exchanging data via the trusted communication link. For example, locking/unlocking of the vehicle, engine control function, electric power steering control function, human-machine interface function, powertrain control function, seat control function, speed control function, transmission control function, brake control function, battery management function, etc. may be performed using the trusted communication link to exchange data among authenticated vehicle devices. For example, the authenticated vehicle devices may use the trusted communication link to exchange data of the engine, brake, passenger cabin, GPS, radar sensor, cameras, laser scanner devices, etc. In another example, door control function, intrusion protection or other security functions may be performed using the trusted communication link. For example, the trusted communication link may be used to transmit user access credentials or other security data from a user device (e.g., a dedicated smart car key, a smart phone installed with a smart key mobile application or other vehicle related mobile applications, or other types of mobile user devices) to corresponding ECUs of the vehicle.

FIGS. 3, 4A, 4B, 4C, 5A, 5B, 5C, and 6 show examples in accordance with one or more embodiments of the invention. The examples shown in FIGS. 3, 4A, 4B, 4C, 5A, 5B, 5C, and 6 may be based on one or more components and the method flow chart discussed in reference to FIGS. 1 and 2 above. Components shown in FIGS. 3, 4A, 4B, 4C, 5A, 5B, 5C, and 6 may be equivalent to components depicted in FIG. 1 above that are identified using same reference numerals. In one or more embodiments, one or more of the modules and elements shown in FIGS. 3, 4A, 4B, 4C, 5A, 5B, 5C, and 6 may be omitted, repeated, and/or substituted. Accordingly, embodiments of the invention should not be considered limited to the specific arrangements of modules shown in FIGS. 3, 4A, 4B, 4C, 5A, 5B, 5C, and 6.

Figure 3:
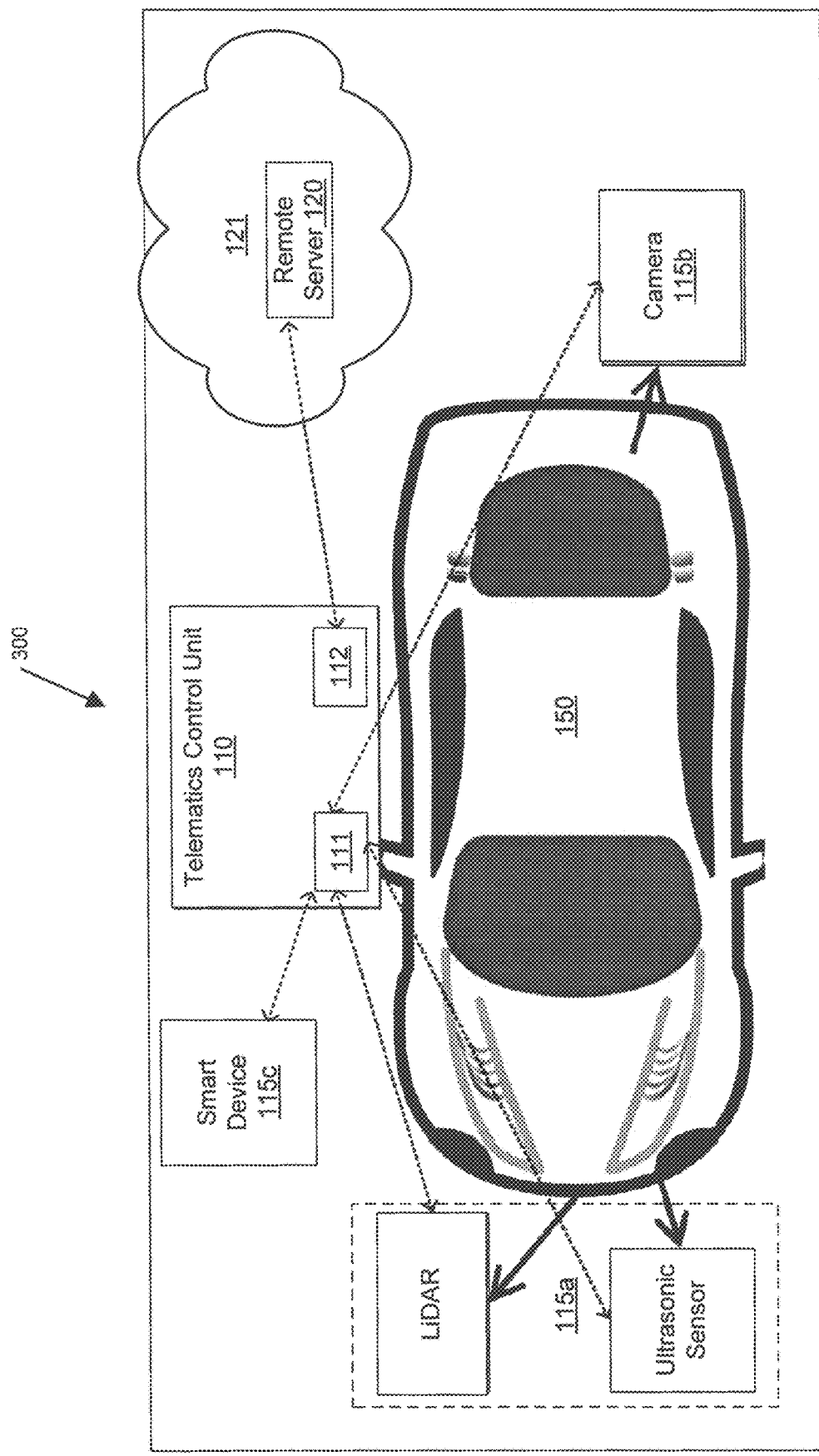
FIG. 3 shows an example system for authenticating vehicle devices using a hybrid two-step authentication technique in accordance with one or more embodiments of the invention.

In particular, FIG. 3 shows an example system (300) for authenticating vehicle devices using a hybrid two-step authentication technique. As shown in FIG. 3, the vehicle (150) includes the TCU (110) and a number of examples of ECUs (115a, 115b, 115c), such as a LIDAR device, an ultrasonic device, a camera device, and a smart device of a user. A mobile application may be installed on the smart device to be used as a remote door key (referred to as a virtual key) to the vehicle (150). Generally, ECUs inside the vehicle (150) are authenticated before the ECUs exchange data with each other and with the external world (e.g., remote server (120)). Such authentication is to prevent hacking and to avoid sending unauthorized and/or misleading data from the vehicle (150) to the remote server (120) and receiving data from unauthorized servers. In accordance with one or more embodiments, the LIDAR device (115*a*), ultrasonic device (115*a*), camera device (115*b*), and smart user device (115*c*) may be authenticated by the TCU (110) inside the vehicle (150). Separately, the TCU (110) itself may be mutually authenticated with the remote server (120). Therefore, by authenticating communication links between ECU-TCU and TCU-remote server, a trusted communication link is established between an ECU (115*a*, 115*b*, 115*c*) and the remote server (120) via the TCU (110).

Figure 4A:
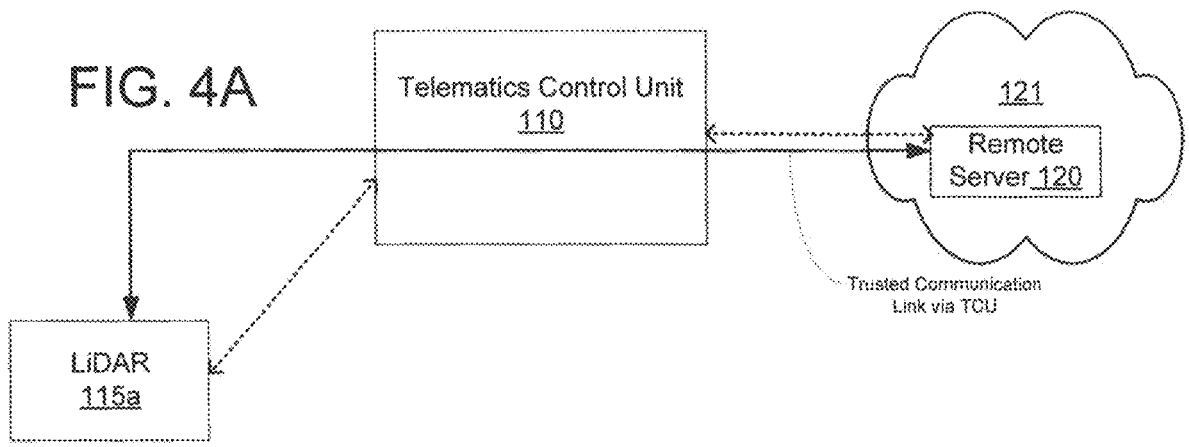
FIG. 4A shows an example trusted communication link for data exchange between an ECU and the remote server in accordance with one or more embodiments of the invention.
Figure 4B:
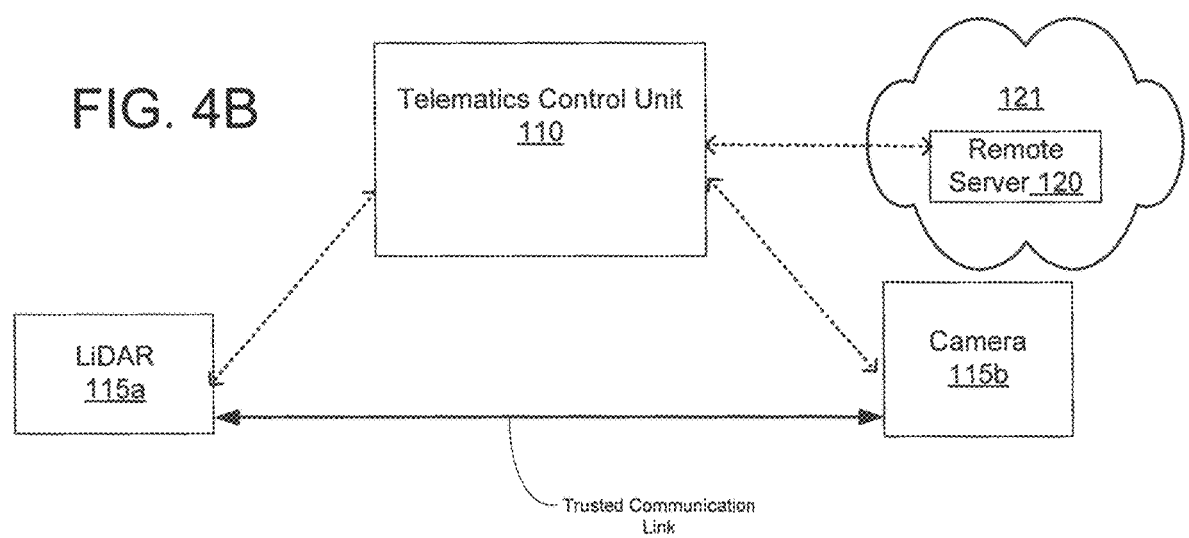
FIG. 4B shows an example trusted communication link for data exchange between ECUs in accordance with one or more embodiments of the invention.
Figure 4C:
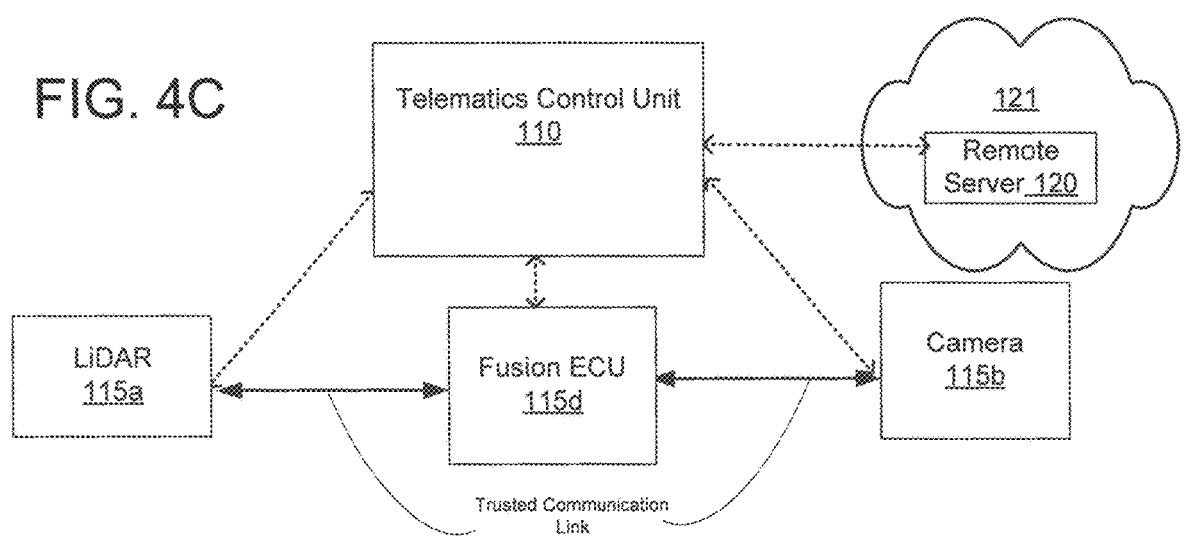
FIG. 4C shows an example trusted communication links between multiple ECUs inside the vehicle in accordance with one or more embodiments of the invention.

FIG. 4A shows an example trusted communication link for data exchange between an ECU (e.g., a LiDAR, 115*a*) and the remote server (120). According to embodiments discussed above, the trusted communication link is established after both the TCU and remote server are mutually authenticated, and after at least the TCU authenticates the ECU (115*a*). This trusted communication link may be used for device to server data exchange, via the TCU. In another example, FIG. 4B shows an example trusted communication link for data exchange between ECU (115*a*) and ECU (115*b*). In yet another example, FIG. 4C shows the trusted communication links between multiple ECUs (i.e., LIDAR (115*a*), fusion ECU (115*d*), and camera (115*b*) inside the vehicle (150). In particular, the fusion ECU (115*d*) is configured to fuse (e.g., combine) data received from two or more ECUs in the vehicle (150). As shown in FIG. 4C, each of these three ECUs (115*a*, 115*d*, 115*b*) may communicate directly with the understanding that the others are trustworthy and not hacked or setup by a malicious actor. Specifically, each of these three ECUs (115*a*, 115*d*, 115*b*) authenticates itself with the TCU (110) while the TCU (110) itself is authenticated with the remote server (120). This process of authentication may be carried out once, for instance at startup of the system, or at specific intervals afterwards. In between authentications, ECUs (115*a*, 115*d*, 115*b*) may query the TCU (110) to check if another ECU is still authenticated. When a new ECU is added, for example, the new ECU is authenticated by the TCU (110), and the approved device list stored in the TCU (110) may be updated to add the new ECU after mutual authentication with the remote server (120) and TCU (110) is re-performed.

Returning to the discussion of FIG. 3, the ECU (110) contains a hardware and/or software based authentication manager that performs the authentication related functions, including: 1) authenticating TCU (110) itself with the remote server (120), and 2) authentication of ECUs inside the vehicle (150). The authentication manager may be partitioned into the local authentication server (111) and the authentication client (112) or may be considered as a single authentication unit.

As described above in the discussion of FIG. 1, the local authentication server (111) is responsible for authenticating ECUs (115*a*, 115*b*, 115*c*). This may be performed using various cryptography techniques, for example the PKI (Public Key Infrastructure) method based on exchanging certificates and pairs of public and private random keys that are mathematically related to each other. The authentication may be performed mutually or only on the TCU side. Mutual authentication means that the TCU and the ECU authenticate each other, prior to which neither side trusts each other. Mutual authentication improves security but increases software and/or hardware complexity, especially in a cross-vendor scenario. In one or more alternate embodiments, the TCU may be presumed to be a trusted entity, in which case the authentication performed is one-sided, where only the ECU is authenticated by the TCU.

The authentication client (112) is responsible for mutual authentication of TCU and the remote server (120) or other servers. Various cryptography techniques, for example the PKI method, may be used for this authentication. The authentication client (112) is also responsible for receiving information related to the ECUs, such as information for revoking certificate of a particular ECU, updating the smart user device used as the remote door key or vehicle data access device, receiving latest access information of a list of smart devices (e.g., user device (115*c*)). In particular, the authentication client (112) may authenticate one or more users of a vehicle who request either physical access to the vehicle or request access to exchange data with the vehicle. Authentication may be required for various applications, including locking or unlocking doors via the smart user device, downloading user's privileges and/or preferences, etc.

Using the hybrid two-step authentication technique, authenticating the smart device (115*c*) locally by the TCU (110) inside the vehicle (150), and authenticating the TCU (110) mutually with the remote server (120) may be performed independently and possibly with different frequencies. The TCU (110) periodically connects with the remote server (120) to synchronize/update a list of user devices (e.g., 115*c*) and their corresponding data. The data corresponding to each user device (e.g., as a file or in other storage formats) may include the authentication level, parameters, period of access, expiration time, etc. The request from the user device (115*c*) for data or for physical access to the vehicle (150) may be processed locally in the vehicle (150) if deemed appropriate by the authentication algorithm running on the TCU (110), or sent to the remote server (120) for processing. Local authentication is expedient while remote authentication is more secure. The hybrid two-step authentication technique takes advantages of both methods and eliminates shortcomings of each. Allowing the local authentication server (111) in the TCU (110) to synchronize/update stored data in the user device reduces security risks and allows multiple authentication levels based on individual users. For example, unauthorized access to the stored data may be blocked when the user device is stolen. In another example, a user may be allowed to access a vehicle for a predefined period of time (e.g., between 2-5 pm, on a specific date).

FIGS. 5A, 5B, and 5C show three example flow diagrams for data exchange between a user authentication client executing on the user device (115*c*), the local authentication server (111) and authentication client (112) executing on the TCU (110), and the remote server (120). The example data exchanges are performed to authenticate the user device (115*c*) and include remote authentication (501), TCU authentication & synchronization (502), and local authentication (503). It should be noted that each of these example flow diagrams can be performed independent of the other diagrams, or in combination with the other diagrams. In FIG. 5A, an authentication request (A1) is sent from the user device (115*c*) to the remote server (120) to perform remote authentication. Accordingly, in step (A2), the remote server (120) returns authentication information (A2) to the user device (115*c*). This is an example scenario in which local authentication is either not possible or not desired. For example, this request may have been generated by a new user in between synchronization intervals of the TCU (110). In other words, the TCU (110) has not yet received information of this new user from the remote server (120). In another example scenario under which step (A1) would occur, the TCU (110) may have performed local authentication for this user in the recent past (e.g., 24 hours earlier) and may decide to perform the remote authentication for additional security reasons.

From time to time, using the authentication client (112), as illustrated in FIG. 5B, the TCU (110) may send a request (B1) to the remote server (120) to synchronize/update access rights, authentication parameters, and/or other information of the user device (115c). For example, the request (B1) may relate to digital locks of the vehicle (150). Accordingly, the remote server returns the synchronized/updated information (B2) to the authentication client (112), which in turn sends a message (B3) to the local authentication server (111) to revise the stored information of the user device (115c) based on the synchronized/updated information (B2). In another example, as shown in FIG. 5C, when the user device (115c) sends an authentication request (C1) to the TCU, the TCU (110) may decide to perform local authentication using the local authentication server (11l) to authenticate the user device (115c), and provide a response to the user device's (115c) local authentication request (C2).

Figure 6:
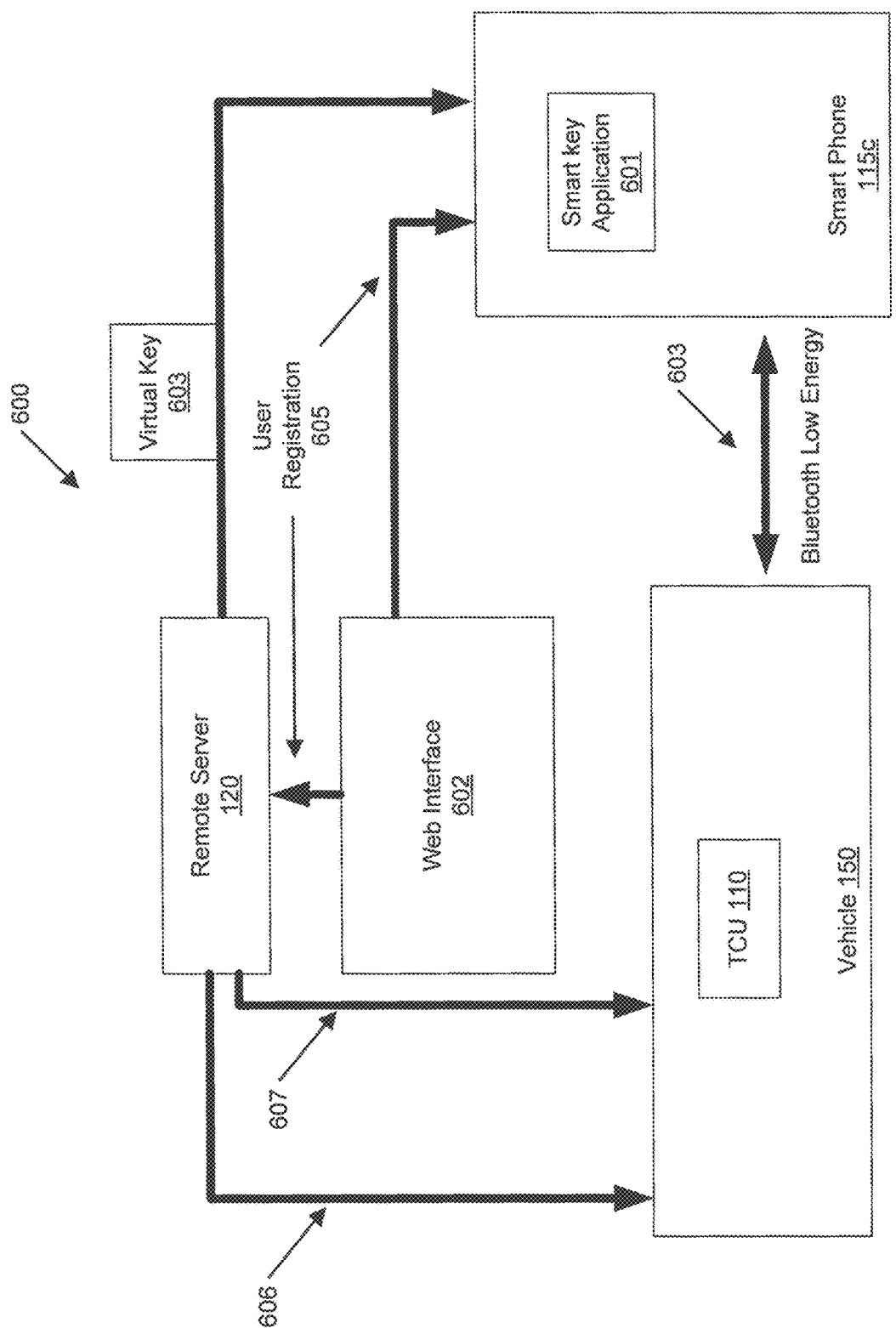
FIG. 6 shows an example application of embodiments of the invention.

FIG. 6 shows an example application of embodiments of the invention. In this figure, an example of a virtual key system (600) is shown that replaces a physical key of the vehicle (150) with a virtual key on a smartphone (i.e., user device (115c)). The smartphone is installed with mobile applications (e.g., smart key application (601)) having smart key based functionalities such as car sharing, autonomous taxi, fleet management, etc. For example, the smart key based functionalities may allow the user to use the smartphone (i.e., user device (115c)) to access and start the vehicle (150), to share the vehicle (150) with friends and family by wirelessly sending a virtual key, to synchronize the smartphone for vehicle status update and interaction, to perform remote automated parking, etc.

Those skilled in the art will appreciate that the invention is not limited to the above-mentioned applications, and may be used in any suitable environment or for any application that involves the advantages of the hybrid two-step authentication process described herein.

As shown in FIG. 6, the TCU (110) is installed in the vehicle (150) and programmed at the time of manufacturing. The user may register through a web interface (602) for using the smartphone to access the vehicle (150). In response to the user registration (605), the remote server (120) generates and sends a new virtual key (603) to the smartphone via the smart key application (601). In addition, the remote server (120) sends the new virtual key (603) as an update (606) to the TCU (110) when a network connection with the vehicle (150) is available for wireless communication. The remote server (120) may also send an update (607) for a virtual lock. The update (606) for the virtual key and the update (607) for the virtual lock are separate from and independent of each other, and may occur at different times. Generally, a small number of locks (e.g., one, two, etc.) exist for each vehicle while each lock may have multiple keys.

Subsequently, when the user is within certain range (e.g., within approximately 15 meters) of the vehicle (150), the smartphone (i.e., user device (115c)) and the TCU (110) communicate with each other, e.g., via the Bluetooth Low Energy (BLE) protocol. The smart key application (601) sends the virtual key (603) to the TCU (110) using, e.g., the BLE protocol, to be compared against the virtual lock stored in the TCU (110) or received in step (607). Upon a comparison match, the TCU (110) sends a command to, e.g. door control ECU, via e.g., vehicle CAN bus network, to unlock the door of the vehicle (150).

In the virtual key system (600), the TCU (110) at some intervals connects with the remote server (120) and synchronizes its local copy of virtual lock(s) and virtual keys. Receiving virtual keys, independent of any user device (e.g., smartphone), adds additional level of security. Virtual lock(s) may also be updated, renewed, or revoked via wireless communication (607). The TCU (110) has the option to perform local authentication in the vehicle (150) or pass the virtual key to the remote server (150) for remote authentication. For example, user authentication for unlocking doors that requires fast response may be performed locally, while authentication for starting engine may be performed in parallel on the remote server (150).

Figure 7:
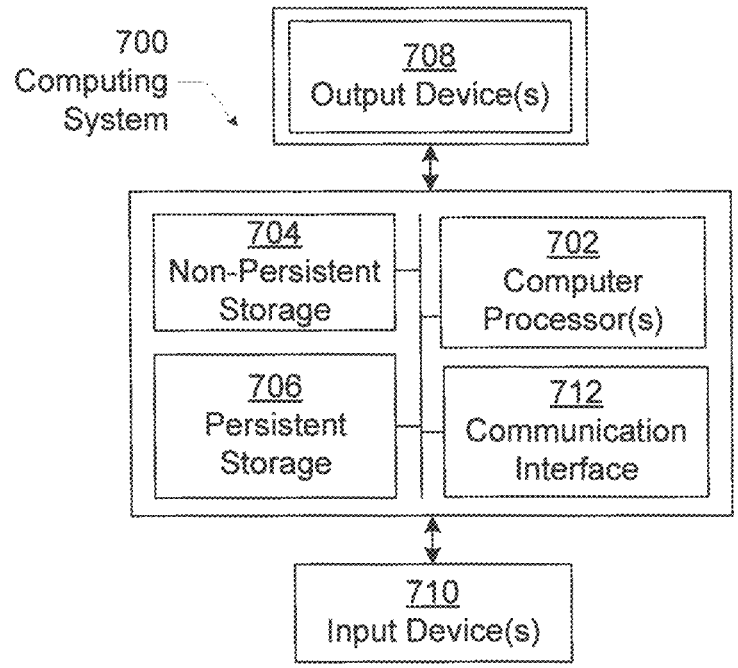
FIGS. 7 and 8 show a computing system in accordance with one or more embodiments of the invention.

Embodiments of the invention may be implemented on a computing system. Any combination of mobile, desktop, server, router, switch, embedded device, or other types of hardware may be used. For example, as shown in FIG. 7, the computing system (700) may include one or more computer processors (702), non-persistent storage (704) (e.g., volatile memory, such as random access memory (RAM), cache memory), persistent storage (706) (e.g., a hard disk, an optical drive such as a compact disk (CD) drive or digital versatile disk (DVD) drive, a flash memory, etc.), a communication interface (712) (e.g., Bluetooth interface, infrared interface, network interface, optical interface, etc.), and numerous other elements and functionalities.

The computer processor(s) (702) may be an integrated circuit for processing instructions. For example, the computer processor(s) may be one or more cores or micro-cores of a processor. The computing system (700) may also include one or more input devices (710), such as a touchscreen, keyboard, mouse, microphone, touchpad, electronic pen, or any other type of input device.

The communication interface (712) may include an integrated circuit for connecting the computing system (700) to a network (not shown) (e.g., a local area network (LAN), a wide area network (WAN) such as the Internet, mobile network, or any other type of network) and/or to another device, such as another computing device.

Further, the computing system (700) may include one or more output devices (708), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (702), non-persistent storage (704), and persistent storage (706). Many different types of computing systems exist, and the aforementioned input and output device(s) may take other forms.

Software instructions in the form of computer readable program code to perform embodiments may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments.

Figure 8:
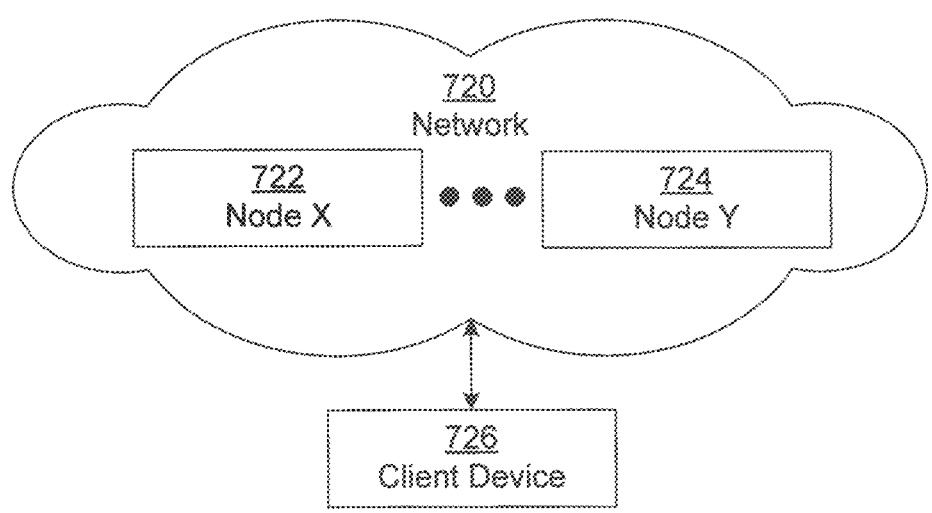

The computing system (700) in FIG. 7 may be connected to or be a part of a network. For example, as shown in FIG. 8, the network (720) may include multiple nodes (e.g., node X (722), node Y (724)). Each node may correspond to a computing system, such as the computing system shown in FIG. 7, or a group of nodes combined may correspond to the computing system shown in FIG. 7. By way of an example, embodiments may be implemented on a node of a distributed system that is connected to other nodes. By way of another example, embodiments may be implemented on a distributed computing system having multiple nodes, where each portion may be located on a different node within the distributed computing system. Further, one or more elements of the aforementioned computing system (700) may be located at a remote location and connected to the other elements over a network.

Although not shown in FIG. 8, the node may correspond to a blade in a server chassis that is connected to other nodes via a backplane. By way of another example, the node may correspond to a server in a data center. By way of another example, the node may correspond to a computer processor or micro-core of a computer processor with shared memory and/or resources.

The nodes (e.g., node X (722), node Y (724)) in the network (720) may be configured to provide services for a client device (726). For example, the nodes may be part of a cloud computing system. The nodes may include functionality to receive requests from the client device (726) and transmit responses to the client device (726). The client device (726) may be a computing system, such as the computing system shown in FIG. 7. Further, the client device (726) may include and/or perform at least a portion of one or more embodiments.

The computing system or group of computing systems described in FIGS. 7 and 8 may include functionality to perform a variety of operations disclosed herein. For example, the computing system(s) may perform communication between processes on the same or different system. A variety of mechanisms, employing some form of active or passive communication, may facilitate the exchange of data between processes on the same device. Examples representative of these inter-process communications include, but are not limited to, the implementation of a file, a signal, a socket, a message queue, a pipeline, a semaphore, shared memory, message passing, and a memory-mapped file. Further details pertaining to a couple of these non-limiting examples are provided below.

The above description of functions presents a few examples of functions performed by the computing system of FIG. 7 and the nodes and/or client device in FIG. 8. Other functions may be performed using one or more embodiments.

While one or more embodiments have been described with respect to a limited number of embodiments, those skilled in the art, having benefit of this disclosure, will appreciate that other embodiments may be devised which do not depart from the scope as disclosed herein. Accordingly, the scope should be limited by the attached claims.

What is claimed is:

1. A telematics control unit (TCU) of a vehicle, comprising:
at least one processor coupled to a memory, the at least one processor comprising a local authentication unit configured to:
locally authenticate, in a first step of a two-step authentication process, at least one device of a plurality of devices in the vehicle based on a first list of approved devices; and
establish, upon successful authentication of the at least one device, a trusted communication link between the TCU and the at least one device to receive a first data from the at least one device and transmit a second data to the at least one device,
wherein the first data is stored in the memory for future transmission to a remote server;
the at least one processor further comprising an authentication client configured to:
wirelessly authenticate the remote server;
transmit at least a portion of the first data to the remote server; and
send information regarding the TCU to the at least one device,
wherein the at least one device authenticates the TCU in a second step of the two-step authentication process, by synchronizing the first list of approved devices and based on the information regarding the TCU, and
wherein establishing the trusted communication link between the TCU and the at least one device is further based on the at least one device authenticating the TCU.

2. The TCU of claim 1, wherein the at least one device is authenticated independent of a network connection between the vehicle and the remote server.

3. The TCU of claim 1, wherein the authentication client is further configured to:
send, to the at least one device, a first indication that the remote server is authenticated;
send, to the remote server, a second indication that the at least one device is authenticated; and
receive a third data from the remote server and transmit the third data to the at least one device through the trusted communication link.

4. The TCU of claim 1, wherein the authentication client is further configured to:
send, to a first device of the plurality of devices, a first indication that a second device of the plurality of devices is authenticated;
send, to the second device, a second indication that the first device is authenticated; and
transmit a vehicle data item between the first device and the second device to facilitate the first device and the second device in performing a function of the vehicle.

5. The TCU of claim 4, wherein the plurality of devices comprises a plurality of electronic control units (ECUs) of the vehicle that are coupled to one or more sensors.

6. The TCU of claim 1, wherein the plurality of devices comprises a user device of a user of the vehicle, and wherein the user device comprises a processor configured to communicate with the TCU to provide user access information for authentication of the user device.

7. The TCU of claim 6, wherein authenticating the user device comprises:
receiving, from the user device, the user access information; and
verifying, by the local authentication unit of the TCU, access rights of the user by comparing the user access information with a second list of approved devices.

8. The TCU of claim 7, wherein the first list of approved devices and the second list of approved devices are stored in the TCU and are periodically updated to reflect changes in the approved devices, wherein the first list of approved devices corresponds to internal vehicle devices and the second list of approved devices corresponds to devices external to the vehicle.

9. A method for authenticating devices in a vehicle, comprising:
    authenticating locally, using a telematics control unit (TCU) of the vehicle, in a first step of a two-step authentication process, at least one device of a plurality of devices in the vehicle based on a first list of approved devices;
    establishing, upon successful authentication of the at least one device, a trusted communication link between the TCU and the at least one device to receive a first data from the at least one device and transmit a second data to the at least one device;
    wirelessly authenticating the remote server using the TCU;
    transmitting at least a portion of the first data to the remote server, when connection to the remote server is enabled; and
    in a second step of the two-step authentication process, authenticating the TCU by synchronizing the list of approved devices when connection to the remote server is enabled,
    wherein the first data is stored in the memory for future transmission to a remote server.

10. The method of claim 9, wherein the at least one device is authenticated independent of a network connection between the vehicle and the remote server.

11. The method of claim 9, further comprising:
    sending, by the TCU to the at least one device, a first indication that the remote server is authenticated;
    sending, by the TCU to the remote server, a second indication that the at least one device is authenticated;
    receiving, by the TCU, a third data from the remote server; and
    transmitting, by the TCU, the third data to the at least one device through the trusted communication link.

12. The method of claim 9, further comprising:
    sending, by the TCU to a first device of the plurality of devices, a first indication that a second device of the plurality of devices is authenticated;
    sending, by the TCU to the second device, a second indication that the first device is authenticated; and
    transmitting a vehicle data item between the first device and the second device to facilitate the first device and the second device in performing a function of the vehicle.

13. The method of claim 12, wherein the plurality of devices comprises a plurality of electronic control units (ECUs) of the vehicle that are coupled to one or more sensors.

14. The method of claim 9, wherein the plurality of devices comprises a user device of a user of the vehicle, and wherein the user device comprises a processor configured to communicate with the TCU to provide user access information for authentication of the user device.

15. The method of claim 14, wherein authenticating the user device comprises:
    receiving, by the TCU from the user device, the user access information; and
    verifying, by the TCU, access rights of the user by comparing the user access information with a second list of approved devices.

16. The method of claim 14, further comprising:
    storing the first list of approved devices and the second list of approved devices in the TCU; and
    periodically updating the first list of approved devices and the second list of approved devices to reflect changes in the approved devices,
    wherein the first list of approved devices corresponds to internal vehicle devices and the second list of approved devices corresponds to devices external to the vehicle.

17. A non-transitory computer readable medium comprising instructions, that when executed, cause a computer processor to:
    locally authenticate, using a telematics control unit (TCU) of a vehicle, in a first step of a two-step authentication process, at least one device of a plurality of devices in the vehicle based on a list of approved devices;
    establish, upon successful authentication of the at least one device, a trusted communication link between the TCU and the at least one device to receive a first data from the at least one device and transmit a second data to the at least one device;
    wirelessly authenticate the remote server using the TCU;
    transmit at least a portion of the first data to the remote server, when connection to the remote server is enabled; and
    in a second step of the two-step authentication process, authenticate the TCU by synchronizing the list of approved devices when connection to the remote server is enabled,
    wherein the first data is stored in the memory for future transmission to a remote server, and
    wherein the at least one device is authenticated independent of a network connection between the vehicle and the remote server.

* * * * *